(12) United States Patent
Narasimhan

(10) Patent No.: US 9,094,697 B2
(45) Date of Patent: Jul. 28, 2015

(54) METHOD OF DELIVERING MEDIA DATA FROM A TRANSMITTER TO A RECEIVER

(75) Inventor: Mandayam A. Narasimhan, San Diego, CA (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 381 days.

(21) Appl. No.: 13/594,792

(22) Filed: Aug. 25, 2012

(65) Prior Publication Data

US 2013/0050575 A1 Feb. 28, 2013

Related U.S. Application Data

(60) Provisional application No. 61/529,806, filed on Aug. 31, 2011.

(51) Int. Cl.
| | |
|---|---|
| H04N 21/2362 | (2011.01) |
| H04N 21/434 | (2011.01) |
| H04N 21/845 | (2011.01) |
| H04N 19/70 | (2014.01) |
| H04N 21/2365 | (2011.01) |

(52) U.S. Cl.
CPC ........... *H04N 21/2362* (2013.01); *H04N 19/70* (2014.11); *H04N 21/4345* (2013.01); *H04N 21/8451* (2013.01); *H04N 21/2365* (2013.01); *H04N 21/4347* (2013.01)

(58) Field of Classification Search
CPC .............. H04N 19/70; H04N 21/2362; H04N 21/2365; H04N 21/4345; H04N 21/4347; H04N 21/8451
See application file for complete search history.

(56) References Cited

U.S. PATENT DOCUMENTS

2002/0035726 A1* 3/2002 Corl ................................. 725/39

FOREIGN PATENT DOCUMENTS

EP 2200210 A2 6/2010

OTHER PUBLICATIONS

ETSI ("Digital Video Broadcasting (DVB); Specification for Service Information (SI) in DVB systems", Final Draft ETSI EN 300 468, V1.12.1, Jun. 2011.).*
Narasimhan, S.; "Proposal to extend descriptor range," Motion Picture Expert Group Meeting, No. m22436, Geneva, Nov. 12, 2011.
"Digital Video Broadcasting (DVB); Specification for Service Information (SI) in DVB systems," ETSI, vol. EN 300 468, No. VI.11.1, Apr. 2010, pp. 29-97.
PCT Search Report & Written Opinion, RE: Application #PCT/US2012/052409; Nov. 22, 2012.
Office Action for Korean Patent Application No. 10-2014-7004918, mailed on Feb. 6, 2015, 6 pages.

* cited by examiner

*Primary Examiner* — Behrooz Senfi
*Assistant Examiner* — Maria Vazquez Colon

(57) ABSTRACT

A method of processing media data received at a receiver over a bitstream having a standardized format that supports descriptors includes receiving at the receiver an extension descriptor that specifies a descriptor tag having a value within a prescribed tag value range, a descriptor length having a value within a prescribed length value range, at least one extension descriptor tag value that identifies a descriptor, and extension descriptor data associated with the identified descriptor. Responsive to the extension descriptor tag value, the identified descriptor and the extension descriptor data associated with the identified descriptor are employed to process the media data at the receiver.

16 Claims, 2 Drawing Sheets

METHOD OF DELIVERING MEDIA DATA FROM A TRANSMITTER TO A RECEIVER

CROSS-REFERENCE TO RELATED APPLICATION

This application claims benefit under 35 USC 120 of U.S. Provisional Application No. 61/529,806 filed Aug. 31, 2011, the entire disclosure of which is hereby incorporated by reference herein for all purposes.

BACKGROUND OF THE INVENTION

The subject matter of this application relates to a method of delivering media data from a transmitter to a receiver.

Referring to FIG. 1 of the drawings, a media data transmitter 8 includes a video encoder 10 that receives raw video data, typically in the HD-SDI format defined in SMPTE 292M, from a source (not shown) such as a camera. The video encoder utilizes the HD-SDI data to generate a video elementary stream and supplies the video elementary stream to a video packetizer 14, which produces a video packetized elementary stream (PES) composed of variable length packets of up to 64 kbytes. Similarly, an audio encoder (not shown) receives raw audio data from, for example, a microphone and supplies an audio elementary stream to an audio packetizer, which creates an audio PES composed of variable length packets.

In generating the video elementary stream, the video encoder compresses the raw video data utilizing prediction techniques based on correlations between successive pictures represented by the raw video data. Typically, each packet of the video PES contains one or more encoded pictures.

The video and audio packetizers may supply the video and audio PESs to a transport stream multiplexer 18, which assigns respective program identifiers (PIDs) to the video PES and the audio PES and organizes the variable-length packets of the video and audio PESs as fixed-length MPEG-2 transport stream (TS) packets each having a header that includes the PID of the PES and a payload containing PES video (or audio) data.

The video and audio elementary streams conveyed by the video and audio PESs are components of the program conveyed by the SPTS. The program may include other components also, such as second language audio, program guide data and subtitles, conveyed by respective packetized elementary streams having respective PIDs assigned thereto.

The TS packets of the SPTS also include a program map table (PMT), which contains the PIDs of the elementary streams conveyed by the SPTS, and may support other signaling mechanisms for conveying information about the program.

The SPTS that is output by the transport stream multiplexer 18 may be supplied to a program multiplexer 22 that combines that SPTS with other transport streams, conveying other programs, to produce a multi-program transport stream (MPTS). The MPTS is transmitted over a channel to a receiver 24 at which a program demultiplexer 26 separates a selected SPTS from the MPTS and supplies it to a transport stream demultiplexer 30. The receiver 24 may be implemented in a set-top box (STB) connected to a digital TV appliance 25. It will be appreciated by those skilled in the art that the SPTS that is output by the transport stream multiplexer 18 may be transmitted directly to the transport stream demultiplexer 30 without first being combined with other transport streams to create the MPTS but in either case the transport stream demultiplexer receives the fixed-length transport stream packets of the selected SPTS and separates them on the basis of PID, depacketizes the transport stream packets to recreate the PES packets, and directs the video PES to a so-called video transport system target decoder (T-STD) 34 and the audio PES to an audio T-STD 38.

The video T-STD 34 comprises a video depacketizer 40 and a video decoder 42. The video depacketizer 40 receives the video PES from the transport stream demultiplexer and provides an encoded bitstream to the video decoder, which decodes the bitstream and outputs a stream of pictures in display order to the TV appliance 25.

The MPEG-2 transport stream, which is defined in the MPEG-2 systems standard (ISO/IEC 13818-1), is widely used for delivery of encoded video over an error prone channel. The MPEG-2 systems standard also defines the MPEG-2 program stream, which may be used for transmission of encoded video in an error free environment. FIG. 1 illustrates transmission of the video and audio PESs as a program stream to a video program system target decoder (P-STD) 50 and an audio P-STD 52 as an alternative to delivery as a transport stream to the video T-STD 34 and audio T-STD 38. The term "MPEG-2 systems standard stream" is used herein to refer to both the MPEG-2 transport stream and the MPEG-2 program stream. It will be appreciated that regardless of whether the video content is delivered over a program stream or a transport stream, other functional blocks than those described and illustrated above might be required in a practical implementation of the method described.

SUMMARY OF THE INVENTION

According to a first aspect of the subject matter of this application there is provided a method of delivering media data for a program from a transmitter to a receiver over a bitstream having a standardized format that supports descriptors each specifying a descriptor tag having a value within a prescribed tag value range and a descriptor length within a prescribed length value range, wherein the method comprises generating at the transmitter an extension descriptor that specifies a descriptor tag having a value within said prescribed tag value range, a descriptor length having a value within said prescribed length value range, at least one extension descriptor tag value that identifies a descriptor, and extension descriptor data associated with the identified descriptor, transmitting the extension descriptor from the transmitter to the receiver as an element of the bitstream, and responsive to the extension descriptor tag value, employing the identified descriptor and the associated extension descriptor data to process the bitstream at the receiver.

According to a second aspect of the subject matter of this application there is provided a method of processing media data received at a receiver over a bitstream having a standardized format that supports descriptors each specifying a descriptor tag having a value within a prescribed tag value range and a descriptor length within a prescribed length value range, wherein the method comprises receiving at the receiver an extension descriptor that specifies a descriptor tag having a value within said prescribed tag value range, a descriptor length having a value within said prescribed length value range, at least one extension descriptor tag value that identifies a descriptor, and extension descriptor data associated with the identified descriptor, and responsive to the extension descriptor tag value, employing the identified descriptor and the extension descriptor data associated with the identified descriptor to process the media data at the receiver.

According to a third aspect of the subject matter of this application there is provided a method of processing media data for transmission by a transmitter over a bitstream having a standardized format that supports descriptors each specifying a descriptor tag having a value within a prescribed tag value range and a descriptor length within a prescribed length value range, wherein the method comprises generating at the transmitter an extension descriptor that specifies a descriptor tag having a value within said prescribed tag value range, a descriptor length having a value within said prescribed length value range, at least one extension descriptor tag value that identifies a descriptor, and extension descriptor data associated with the identified descriptor, and transmitting the extension descriptor from the transmitter as an element of the bitstream.

According to a fourth aspect of the subject matter of this application there is provided a non-transitory computer readable medium containing software that, when executed by a computer having an input for receiving a signal conveying media data received over a bitstream having a standardized format that supports descriptors each specifying a descriptor tag having a value within a prescribed tag value range and a descriptor length within a prescribed length value range, processes the media data by a method that comprises receiving an extension descriptor that specifies a descriptor tag having a value within said prescribed tag value range, a descriptor length having a value within said prescribed length value range, at least one extension descriptor tag value that identifies a descriptor, and extension descriptor data associated with the identified descriptor, and responsive to the extension descriptor tag value, employing the identified descriptor and the extension descriptor data associated with the identified descriptor to process the media data.

According to a fifth aspect of the subject matter of this application there is provided a non-transitory computer readable medium containing software that, when executed by a computer having an output for transmitting a signal conveying media data over a bitstream having a standardized format that supports descriptors each specifying a descriptor tag having a value within a prescribed tag value range and a descriptor length within a prescribed length value range, processes the media data by a method that comprises generating an extension descriptor that specifies a descriptor tag having a value within said prescribed tag value range, a descriptor length having a value within said prescribed length value range, at least one extension descriptor tag value that identifies a descriptor, and extension descriptor data associated with the identified descriptor, and transmitting the extension descriptor as an element of the bitstream.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
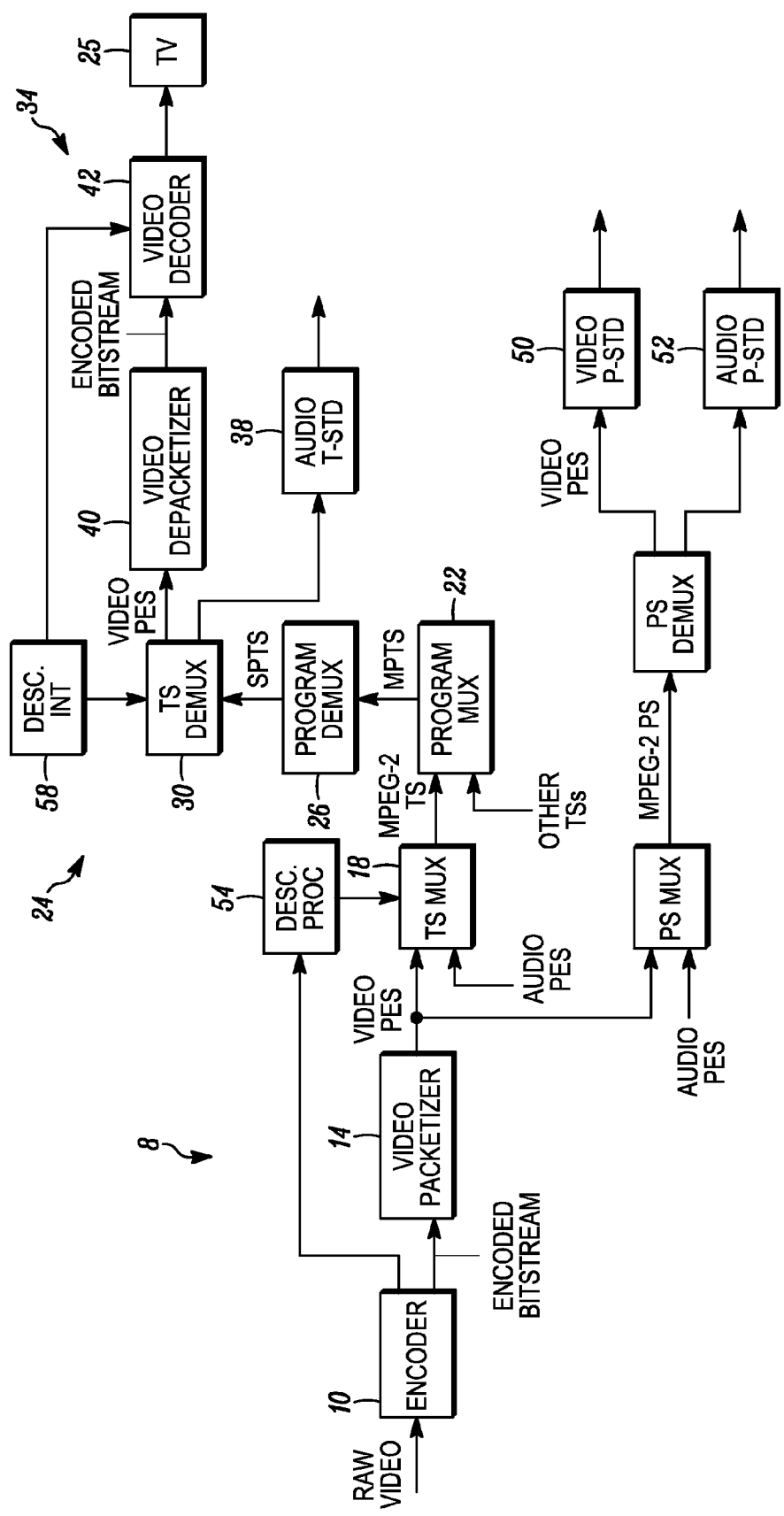
FIG. 1 is a block schematic illustration of the architecture of a first system for supplying compressed video material for presentation.

The program map table (PMT) of the MPEG-2 transport stream produced by the transport stream multiplexer 18 may contain program specific information (PSI), i.e. information about the program conveyed by the transport stream. The PSI may include descriptors containing standards-defined or user-defined data elements. For example, the program map table may include a video_stream_descriptor containing coding parameters of a video elementary stream. The descriptors may be used to signal information about the program to the video T-STD 34 and the audio T-STD 38. Similar descriptors may be conveyed in a program stream map of an MPEG-2 program stream to signal information about the program to the video P-STD 50 and the audio P-STD 50.

As noted above, descriptors may be employed to signal information both to a video STD and an audio STD. For simplicity, the following discussion will relate primarily to descriptors that are used to signal information to the video T-STD 34 but it will be appreciated that the principles and concepts that are discussed may be extended to the video P-STD and to audio STDs.

The descriptor is associated with the MPEG-2 systems stream at a program or component level and signals functions and parameters that may apply to an entire program or to any component of the program.

The MPEG-2 systems standard defines the descriptor with a standard syntax format that uses {descriptor tag, descriptor length, descriptor_data ( )}. One example of a descriptor is the AVC video descriptor:

| Syntax | No. of bits | Mnemonic |
|---|---|---|
| AVC_video_descriptor ( ) { | | |
| descriptor_tag | 8 | uimsbf |
| descriptor_length | 8 | uimsbf |
| profile_idc | 8 | uimsbf |
| constraint_set0_flag | 1 | bslbf |
| constraint_set1_flag | 1 | bslbf |
| constraint_set2_flag | 1 | bslbf |
| AVC_compatible_flags | 5 | bslbf |
| level_idc | 8 | uimsbf |
| AVC_still_present | 1 | bslbf |
| AVC_24_hour_picture_flag | 1 | bslbf |
| reserved | 6 | bslbf |
| } | | |

The AVC video descriptor signals the video T-STD 34 that the bitstream produced by the video encoder 10 complies with the video compression standard that is specified in ISO/IEC 14496-10 (MPEG-4 part 10) Advanced Video Coding (AVC), commonly known as H.264/AVC. A video T-STD with appropriate functionality responds to the AVC video descriptor by executing a program that decodes the H.264/AVC bitstream utilizing parameters conveyed by the AVC video descriptor. A video T-STD without H.264/AVC functionality does not respond to the AVC video descriptor. In general, the descriptor structure identifies an operation that is to be carried out by the receiver and at least one argument relating to that operation.

The descriptor tag identifies the descriptor by an 8-bit number that is allocated to the particular descriptor by the Motion Picture Experts Group (MPEG), which is recognized as the standards-setting group having responsibility for allocating the values of the descriptor tag to descriptors. For example, MPEG has assigned the descriptor tag 40 to the AVC video descriptor.

The descriptor length specifies the length of the descriptor in bytes. Since the descriptor length is an 8-bit value the descriptor may be up to 256 bytes in length. In practice, most descriptors are about 6 bytes in length.

The descriptor tag and the descriptor length are followed in the descriptor by the descriptor data, which contains the structure of the descriptor, including the parameter values that are conveyed by the descriptor.

In order to utilize descriptors, the media data transmitter 8 includes a descriptor processor 54 that receives information pertaining to one or more predetermined characteristics of the encoded bitstream and/or the raw video data, which will affect operations to be performed by the T-STD 34 on the encoded bitstream produced by the video depacketizer and/or on the video data produced by the video decoder. For example, the descriptor processor 54 may receive information from the video encoder 10 indicating that the bitstream has been encoded in accordance with H.264/AVC and parameter values pertinent to this characteristic of the bitstream. The descriptor processor responds to such information by identifying at least one of the allocated descriptors associated with the operation(s), creating the identified descriptor, and supplying the created descriptor to the TS multiplexer 18 for adding to the PMT of the SPTS. In the case of the example, the descriptor processor identifies the AVC video descriptor. The information may be received by the descriptor processor separately from the bitstream, as schematically shown in FIG. 1, or it may be included in the bitstream.

The TS demultiplexer 30 receives the transport stream, separates the descriptor from the encoded video data and supplies the descriptor to a descriptor interpreter 58. The descriptor interpreter 58 provides commands and/or information derived from the descriptor to the video T-STD, which responds by performing the appropriate operations in accordance with the identity and structure of the descriptor.

Figure 2:
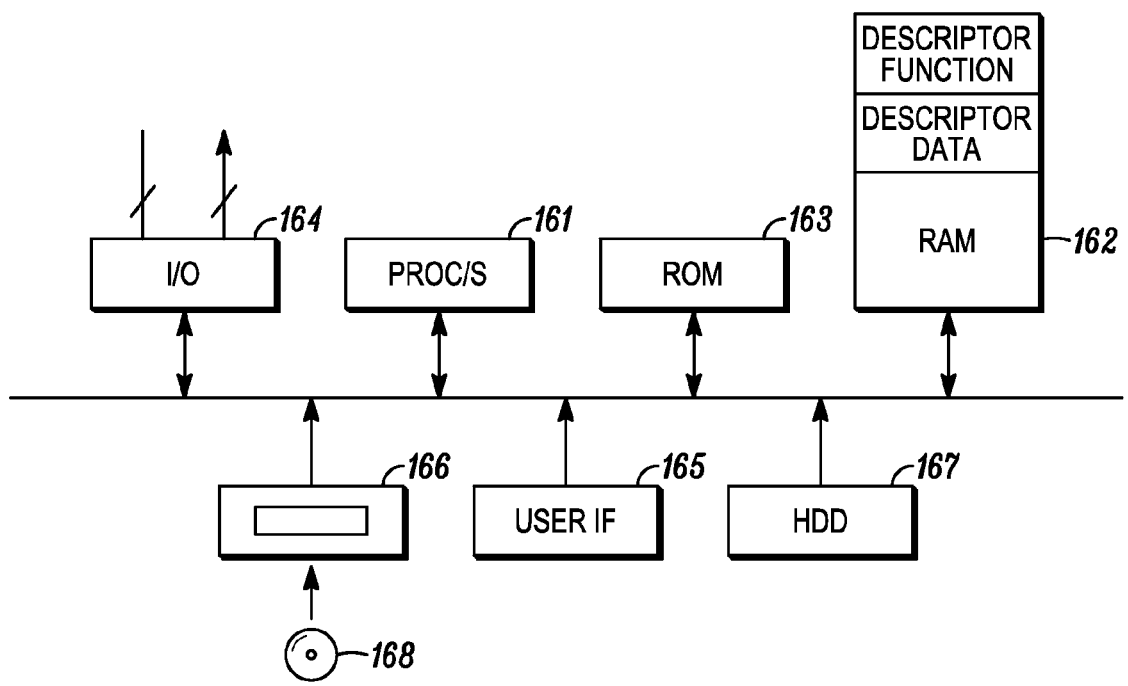
FIG. 2 is a block schematic diagram of a computing machine that may be used to implement parts of the system described with reference to FIG. 1.

Referring to FIG. 2, the descriptor processor and/or the descriptor interpreter may be implemented using a computer comprising at least one processor 161, random access memory 162, read only memory 163, I/O devices 164 (including suitable adaptors for receiving and transmitting bitstreams), a user interface 165, a CD ROM drive 166 and a hard disk drive 167, configured in a generally conventional architecture. The computer operates in accordance with a program that is stored in a non-transitory computer readable medium, such as the hard disk drive 167 or a CD-ROM 168, and is loaded into the random access memory 162 for execution. The program is composed of instructions such that when the computer receives a signal representing the input of the descriptor processor or descriptor interpreter, by way of a suitable interface included in the I/O devices 164, the computer allocates memory to appropriate buffers and utilizes other suitable resources and functions to perform the various operations that are described above as being performed by the descriptor processor or descriptor interpreter. FIG. 2 illustrates schematically that a descriptor function and descriptor parameters have been loaded into the RAM 162.

It will be appreciated by those skilled in the art that the program might not be loadable directly from the CD-ROM 168 into the random access memory utilizing the CD-ROM drive 166 and that generally the program will be stored on the CD-ROM or other distribution medium in a form that requires the program to be installed on the hard disk drive 167 from the CD-ROM 168.

The 8-bit value of the descriptor tag supports 256 different descriptors. MPEG has assigned 192 values of the descriptor tag to private uses, leaving only 64 values of the tag available for public use. MPEG has already allocated most of the 64 descriptor values available for public use to codecs and applications. Only a small number of descriptor values remain available for future use.

The number of available descriptor tags is increased, without violating the descriptor syntax prescribed in the MPEG-2 systems standard, by allocating a descriptor tag value that is not currently allocated, for example the value 63 (which is the last allocatable value permitted under the MPEG-2 systems standard) to an extension descriptor that has the following format:

| Syntax | No. of bits | Mnemonic |
|---|---|---|
| Extension_descriptor ( ) { | | |
|     descriptor_tag | 8 | uimsbf |
|     descriptor_length | 8 | uimsbf |
|     Extension_descriptor_tag | 8 | uimsbf |
|     If ( Extension_descriptor_tag == 0x02) { | | bslbf |
|         extension_descriptor_02_length | 8 | uimsbf |
|         extension_descriptor_02_data ( ) | | bslbf |
|     } | | |
|     else if (Extension_descriptor_tag == 0x03 { | | bslbf |
|         extension_descriptor_03_length | 8 | uimsbf |
|         extension_descriptor_03_data ( ) | | |
|     } | | |
| /* if only 2 are defined during the standardization */ | 1 | bslbf |
| } | | |

The extension descriptor complies with the syntax for a descriptor. Thus, the extension descriptor is of the form {descriptor tag, descriptor length, descriptor_data ( )}, and the descriptor tag and descriptor length are each 8-bit values and are followed by the structure of the descriptor. The structure of the extension descriptor includes the 8-bit extension descriptor tag, having 256 possible values. In a practical implementation, the extension descriptor tag value 0 is usually reserved and the extension descriptor tag value 1 is usually forbidden, i.e. cannot be used, and therefore 254 extension descriptor tag values are available.

MPEG (or another standard setting organization) allocates extension descriptor tag values to particular descriptors and publishes a table that identifies the tag values and the corresponding descriptors. The table may be in the following form:

Extension Descriptor Tag Values

| Extension_descriptor_tag | TS | PS | Identification |
|---|---|---|---|
| 0 | n/a | n/a | Reserved |
| 1 | n/a | X | Forbidden |
| 2 | X | X | New_video_descriptor |
| 3 | X | X | New_audio_descriptor |
| 4-255 | n/a | n/a | ITU-T Rec. H.222.0\|ISO/IEC 13818-1 Reserved |

In accordance with this table, the extension descriptor tag value 2 is allocated to new_video_descriptor and the tag value 3 is allocated to new_audio_descriptor. The extension descriptor may specify more than two values of the extension descriptor tag but two values suffice to illustrate the structure and syntax of the extension descriptor. In the case of this example, the extension descriptor structure may be in the form:

| Variable | Value |
|---|---|
| Extension_descriptor_tag | 2 |
| Extension_descriptor_length | 12 |
| Extension_descriptor_data ( ) | |

The descriptor interpreter parses the extension descriptor, identifies the extension descriptor tag and applies the (if, then, else) statement to the extension descriptor tag. Since the extension descriptor tag is 2, the descriptor interpreter selects the new video descriptor and associates the extension descriptor length and the extension descriptor data with the new video descriptor. If instead the extension descriptor tag had been 3, the descriptor interpreter would have selected the new audio descriptor and associated the extension descriptor length and the extension descriptor data with the new audio descriptor.

The extension descriptor structure may contain several extension descriptor tag statements. Suppose that the allocation table associated ten extension descriptor tag values (2-11) with descriptor 2 through descriptor 11, that in a particular general application a subset of four descriptors, e.g. descriptors 2, 3, 6 and 8 were potentially used, and of that subset only descriptors 3 and 8 were used in a specific implementation of the general application. The extension descriptor data may then be in the form:

| Variable | Value |
|---|---|
| Extension_descriptor_tag | 3 |
| Extension_descriptor_length | 9 |
| Extension_descriptor_data ( ) | |
| Extension_descriptor_tag | 8 |
| Extension_descriptor_length | 5 |
| Extension_descriptor_data ( ) | |

If the extension descriptor has a structure in accordance with the example given above, the descriptor interpreter parses the extension descriptor, identifies the first extension descriptor tag (3) and applies the (if, then, else) statement to the extension descriptor tag. The (if, then, else) statement tests the extension descriptor tag against the four potential values (2, 3, 6 and 8). Since the extension descriptor tag is 3, the descriptor interpreter selects descriptor 3 and associates the extension descriptor length and the extension descriptor data with descriptor 3. The descriptor interpreter also identifies the second descriptor tag (8), selects descriptor 8 and associates the extension descriptor length and the extension descriptor data with descriptor 8.

The extension descriptor serves as a container for multiple descriptor structures. However, the total length of the descriptors specified in the extension descriptor is less than 256 bytes. Assuming a typical descriptor uses 6 bytes, the number of descriptors that can be accommodated may be 30-36.

If in a particular case only one extension descriptor tag value, e.g. the tag value 3, were of interest, the syntax of the extension descriptor could be simplified by omitting the (if, then, else) statement. In the case of this example, the extension descriptor may then be of the form:

| Syntax | No. of bits | Mnemonic |
|---|---|---|
| Extension_descriptor ( ) { | | |
| descriptor_tag | 8 | uimsbf |
| descriptor_length | 8 | uimsbf |
| extension_descriptor_tag_03 | 8 | uimsbf |
| extension_descriptor_03_length | 8 | bslbf |
| extension_descriptor_03_data( ) | | |

In this case, the statement extension_descriptor_tag_03 explicitly identifies the tag value and the descriptor interpreter selects the new audio descriptor and associates the extension descriptor length and extension descriptor data with the new audio descriptor.

The extension descriptor complies with the syntax for a descriptor as defined in the current MPEG-2 systems standard. Consequently, the extension descriptor is backwardly compatible with the descriptor definition in the MPEG-2 systems standard and a descriptor interpreter that does not recognize an extension descriptor will simply ignore it.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method of processing media data received at a receiver over a bitstream having a standardized format that supports descriptors each specifying a descriptor tag having a value within a prescribed tag value range and a descriptor length within a prescribed length value range, wherein the method comprises:

receiving at the receiver an extension descriptor that specifies a descriptor tag having a value within said prescribed tag value range, a descriptor length having a value within said prescribed length value range, at least one extension descriptor tag value that identifies a descriptor, and extension descriptor data associated with the identified descriptor, and responsive to the extension descriptor tag value, employing the identified descriptor and the extension descriptor data associated with the identified descriptor to process the media data at the receiver, the extension descriptor data including at least one logic statement for testing the extension descriptor tag value against at least two potential extension descriptor tag values.

2. The method according to claim 1, further comprising:

evaluating the logic statement, determining which of the potential extension descriptor tag values satisfies the logic statement and, responsive to the determined potential extension descriptor tag value, employing the descriptor identified by the potential extension descriptor tag value and the extension descriptor data associated with the identified descriptor to process the bitstream.

3. A non-transitory computer readable medium containing software that, when executed by a computer having an input for receiving a signal conveying media data received over a bitstream having a standardized format that supports descriptors each specifying a descriptor tag having a value within a prescribed tag value range and a descriptor length within a prescribed length value range, processes the media data by a method that comprises:

receiving an extension descriptor that specifies a descriptor tag having a value within said prescribed tag value range, a descriptor length having a value within said prescribed length value range, at least one extension descriptor tag value that identifies a descriptor, and extension descriptor data associated with the identified descriptor, and responsive to the extension descriptor tag value, employing the identified descriptor and the extension descriptor data associated with the identified descriptor to process the media data, the extension descriptor specifying n extension descriptor tag values (where n is an integer greater than 1), the extension descriptor data including at least one logic statement for testing the extension descriptor tag values against m potential extension descriptor tag values (where m is an integer greater than n−1).

4. The method according to claim 1, wherein the bitstream is an MPEG-2 systems standard stream, the prescribed tag value range is a tag value range permitted by the MPEG-2 systems standard, and the prescribed length value range is a length value range permitted by the MPEG-2 systems standard.

5. A method of processing media data for transmission by a transmitter over a bitstream having a standardized format that supports descriptors each specifying a descriptor tag having a value within a prescribed tag value range and a descriptor length within a prescribed length value range, wherein the method comprises:
generating at the transmitter an extension descriptor that specifies a descriptor tag having a value within said prescribed tag value range, a descriptor length having a value within said prescribed length value range, at least one extension descriptor tag value that identifies a descriptor, and extension descriptor data associated with the identified descriptor, and
transmitting the extension descriptor from the transmitter as an element of the bitstream, the extension descriptor data including at least one logic statement for testing the extension descriptor tag value against at least two potential extension descriptor tag values.

6. The method according to claim 5, wherein the extension descriptor specifies n extension descriptor tag values (where n is an integer greater than 1) and the extension descriptor data includes at least one logic statement for testing the extension descriptor tag values against m potential extension descriptor tag values (where m is an integer greater than n−1).

7. The method according to claim 5, wherein the bitstream is an MPEG-2 systems standard stream, the prescribed tag value range is a tag value range permitted by the MPEG-2 systems standard, and the prescribed length value range is a length value range permitted by the MPEG-2 systems standard.

8. The method according to claim 3, further comprising:
for each specified extension descriptor tag value, evaluating the logic statement, determining which of the potential extension descriptor tag values satisfies the logic statement and, responsive to the determined potential extension descriptor tag value, employing the descriptor identified by the potential extension descriptor tag value and the extension descriptor data associated with the identified descriptor to process the bitstream.

9. The method according to claim 1, wherein the bitstream is an MPEG-2 systems standard stream, the prescribed tag value range is a tag value range permitted by the MPEG-2 systems standard, and the prescribed length value range is a length value range permitted by the MPEG-2 systems standard.

10. The method according to claim 1, wherein the bitstream is based on H.264/AVC.

11. The method according to claim 1, wherein the extension description serves as a container for multiple descriptor structures.

12. The method according to claim 5, wherein the bitstream is based on H.264/AVC.

13. The method according to claim 5, wherein the extension description serves as a container for multiple descriptor structures.

14. The method according to claim 3, wherein the bitstream is an MPEG-2 systems standard stream, the prescribed tag value range is a tag value range permitted by the MPEG-2 systems standard, and the prescribed length value range is a length value range permitted by the MPEG-2 systems standard.

15. The method according to claim 3, wherein the bitstream is based on H.264/AVC.

16. The method according to claim 3, wherein the extension description serves as a container for multiple descriptor structures.

* * * * *